United States Patent Office

3,652,474
Patented Mar. 28, 1972

3,652,474
HOT-MELT ADHESIVE COMPOSITION CONTAINING ROSIN POLYESTER
David A. Berry and Albert R. Bunk, Columbus, Ohio, and Noah J. Halbrook, Walter H. Schuller, and Ray V. Lawrence, Lake City, Fla., assignors to the United States of America as represented by the Secretary of Agriculture
No Drawing. Filed Feb. 27, 1970, Ser. No. 15,236
Int. Cl. C09j 3/26
U.S. Cl. 260—27 EV                 4 Claims

ABSTRACT OF THE DISCLOSURE

Hot-melt adhesive composition consisting essentially, in relative proportions by weight, of 100 parts of an ethylene-vinyl acetate resin of Ball and Ring softening point between 220° and 280° F. and whose ethylene-vinyl acetate weight percent comonomer ratio is between 85:15 and 65:35; between 40 and 120 parts of a petroleum-derived paraffin or microcrystalline wax; and between 25 and 125 parts of a rosin polyester having an Acid No. below 45 and a Ball and Ring softening point between 50° and 150° F. which rosin polyester is the diethylene glycol ester of β-propiolactone-modified or acrylic-acid-modified rosin.

---

A non-exclusive, irrevocable, royalty-free license in the invention herein described, throughout the world for all purposes of the United States Government, with the power to grant sublicenses for such purposes, is hereby granted to the Government of the United States of America.

DISCLOSURE

This invention relates to hot-melt ethylene-vinyl acetate copolymer resin adhesive compositions which are applied hot to various substrates and which upon cooling form a bond adhering the substrates together. More particularly, the invention concerns a hot-melt adhesive composition consisting essentially of ethylene-vinyl acetate resin, petroleum-derived wax, and a rosin polyester.

Hot-melt adhesives are bonding materials known to be applied hot and upon cooling to the solid state to form a bond between substrates. Application of heat to a hot-melt adhesive brings it to a liquid state, and after removal of the heat it sets by merely cooling. Where the cooling is rapid, nearly instantaneous bonding is possible. The hot-melt adhesive system frequently offers increased production speeds and lower costs than other adhesive systems. In general, useful hot-melt adhesive compositions are essentially thermoplastic, all-solid material with no solvent being used therewith. In the past, a large number of natural and synthetic waxes and resins have served as principal constituents in various useful hot-melt adhesive compositions. The natural waxes and resins typically have low strength and melt easily to low viscosity fluids. Generally in hot-melt adhesive these natural materials are blended with various proportions of higher strength and high molecular weight synthetic resins, such as polyamides, polyvinyl acetate, ethylene-vinyl acetate, or the like. In such compositions the synthetic resin acts as a film former imparting the principal adhesion strength and the natural resin serves to lower the adhesive's cost and is useful also therein to improve certain desirable properties of the hot-melt adhesive system. Many adhesives also contain minor amounts of other constituents for improving film formation, imparting tack, flexibility, gloss, and the like. Desirable properties in a hot-melt adhesive are its adhesion strength to various substrates, heat stability at its application temperature for a prolonged period, i.e. useful pot life, ability to adequately wet the substrates to which it is applied, flexibility in its solid state, block resistance, and the like properties. Although various useful hot-melt adhesive compositions are known, there has continued to be a need for other and additional hot-melt adhesive compositions offering lower cost formulations and equivalent and/or improved properties and containing materials hitherto not known to be useful in such compositions. It is to fulfilling those needs that the present invention is directed.

The hot-melt adhesive composition of the invention, in relative proportions by weight, consists essentially of three principal constituents, namely 100 parts of an ethylene-vinyl acetate resin, between 25 and 125 parts of a rosin polyester, and between 40 and 120 parts of a petroleum-derived microcrystalline or paraffin wax. The preferred composition of the invention, for each 100 parts by weight of the ethylene-vinyl acetate resin included therein, contains between 60 and 90 parts by weight of the rosin polyester and between 70 and 80 parts by weight of a microcrystalline wax.

The ethylene-vinyl acetate resin included in the composition is a high-molecular weight thermoplastic copolymer of ethylene and vinyl acetate comonomers in an ethylene-vinyl acetate weight percent ratio between about 85:15 to 65:35. This resin is well known to the art with teachings available for its preparation, properties, and utility in hot-melt adhesive formulations. For hot-melt adhesive purposes it is available in various molecular weights with molecular weight distributions giving the resin a Ball and Ring softening point above about 220° F., generally between about 240° and 280° F., and a melt viscosity, upon blending with lower molecular weight modifiers and extenders, permitting hot-melt application generally at a temperature between about 240° and 280° F. In the absence of modifiers and extenders, ethylene-vinyl acetate resin even in the molten state is so viscous at the hot-melt application temperatures customarily employed that the resin copolymer is of little utility for hot-melt adhesive purposes.

In the hot-melt adhesive composition of the invention there is included a petroleum-derived paraffin or microcrystalline wax. Crystalline or paraffin wax is derived from dewaxing of distillate lubricating fractions and microcrystalline wax from dewaxing the residual lubricating fractions of the crude petroleum. The paraffin waxes generally have a melting point in the range of 120°–160° F., while the microcrystalline waxes have a melting point in the range of 150°–195° F. The paraffin waxes consist essentially of straight-chain hydrocarbons of about 26–30 carbons per molecule. The microcrystalline waxes consists essentially of branched-chain hydrocarbons of about 41–50 carbons per molecule. In the adhesive composition of the invention, the utilization therein of a petroleum-derived paraffin or microcrystalline wax serves to lower viscosity at hot-melt application temperatures, provides smear and blocking resistance, and advantageously improves wetting of some substrates. In the composition of the invention the petroleum-derived wax employed therein has a melting point significantly lower than the B. & R. softening point of the ethylene-vinyl acetate resin included therein. In blends of the ethylene-vinyl acetate resin and the petroleum-derived wax, compatibility of the wax and resin becomes limited as the vinyl acetate content of the copolymer resin approaches 35 percent. The microcrystalline wax is more compatible in the resins of lower vinyl acetate content with its optimum compatibility being noted with those resins generally of 20 to 25 percent vinyl acetate content, while the paraffin wax is more compatible in the resins of higher vinyl acetate content with its optimum compatibility being noted with those resins of 25 to 30 percent vinyl acetate content. The petroleum-derived wax is included in the composition, for each 100 parts by weight of the ethylene-vinyl acetate resin, in an amount between 40 and 120 parts by weight, and preferably is included in an amount between 70 and 80 parts by weight.

Essential to the hot-melt adhesive composition of the invention is inclusion therein of between 25 and 125 parts by weight of a rosin polyester, preferably between 60 and 90 parts by weight of the rosin polyester for each 100 parts by weight of ethylene-vinyl acetate resin included in the composition. The rosin polyester in the composition serves to reduce cost, lower hot-melt viscosity, increase adhesion, and improve heat stability of the composition. In general, the rosin polyester employed in the composition is the esterification product of diethylene glycol and the addition product of β-propiolactone and/or acrylic acid to rosin. The esterification employs between 110–120 percent of the amount of diethylene glycol required to react all of the carboxyl groups of the addition product (i.e. 1.1–2.0 OH per COOH are employed). This esterification product, referred to as "rosin polyester" herein, is a mixture of polyester and rosin diol but is rich in rosin diol when the ratio of glycol to modified rosin is high. The polyester for the most part is a structure composed of diethylene glycol moieties linking β-propiolactone-modified or acrylic-acid-modified rosin moieties. The rosin diol for the most part is the diethylene glycol-modified rosin ester having the schematic illustrative structure shown below;

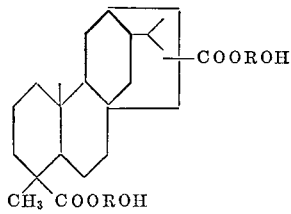

wherein R is the —CH$_2$CH$_2$OCH$_2$CH$_2$— radical. The employed rosin diol has an Acid No. less than about 45 and most desirably within the range of 35 to 15, and also has a Ball and Ring softening point between 50 and 150° F., and preferably between 70 and 136° F.

With respect to the rosin polyester used in the composition, the term "rosin" includes unmodified gum rosin, unmodified wood rosin, and unmodified tall-oil rosin, as well as other natural rosins having a substantial content of rosin acids which isomerize to provide abietic-type resin acids under those reactant conditions at which lactone or acrylic acid react to provide a polycarboxylic rosin derivative. "β-Propiolactone" includes β-propiolactone and the polymer of β-propiolactone. "Acrylic acid" includes alpha ethylenically unsaturated carboxylic acids, particularly acrylic acid per se, and lower alkyl substituted acrylic acids. The term "β-propiolactone-modified rosin" relates to the polycarboxylic acid of rosin derived from addition of β-propiolactone to rosin. The term "acrylic-acid-modified rosin" relates to the polycarboxylic acid of rosin derived from Diels-Alder addition of the acrylic acid to rosin.

In addition to diethylene glycol, various other glycols can be used. In general, the useful diols are aliphatic diols of up to 10 carbon atoms. Illustrative and representative of useful diols for preparation of the rosin polyester from the lactone-modified and acrylic-acid-modified rosins are: ethylene glycol; propane-diol-1,2; propane-diol-1,3; butane-diol-1,3; butane-diol-1,4; pentanediol-1,5; 2,2-dimethylpropane-diol-1,3; hexane-diol-1,6; diethylene glycol; butene-diol-1,4- butene-diol-1,2; dipropylene glycol; triethylene glycol; 2,2-dimethyl,1,3-propane diol; and the like, as well as various mixtures thereof.

Employment of β-propiolactone with various rosins to prepare the β-propiolactone-modified rosin is included in teachings of Halbrook, et al. in U.S. Pat. No. 3,317,445, and "Industrial and Engineering Chemistry Product Research and Development," vol. 2, No. 3, September 1963, pages 182–185, and "Journal of Organic Chemistry," vol. 29, (5), May 1966, pages 1017–1021. Fikentscher, et al., U.S. Pat. No. 2,973,332, includes teachings of preparing the acrylic-acid-modified rosin. As is apparent from art teachings, considerable variance is permissible in preparing the β-propiolactone-modified and acrylic-acid-modified rosins. In general, the starting rosin may be of any grade, such as from X through G grades, inclusive, so long as the rosin acids therein constitute at least a high proportion of its content, generally more than 50 percent conjugated dienic rosin acids and more than 65 percent total rosin acids, with the balance being neutrals and unreactive rosin masses. These unreactive materials as long as present in no more than conventional amounts are not detrimental to practice of the invention. Upon determination, by known conventional means, of the conjugated dienic content of the particular rosin being employed as a starting material, there is utilized an amount equivalent to generally between from 5 to 21.6 parts by weight of β-propiolactone, or acrylic acid for each 100 parts by weight of rosin containing about 65 percent conjugated dienic acids. In other words, the β-propiolactone or the acrylic acid, as the case may be, is employed in an amount to react with from about one-third to all of the conjugated dienic acids in the rosin.

In preparation of the useful rosin polyester from these modified rosin products, there is employed an amount of diethylene glycol between 110–120 percent of that amount providing a hydroxyl group for each carboxyl group present, including the carboxyl groups of the lactone-modified and acrylic-acid-modified rosins, wtih the esterification reaction carried forth until the acid number of the resulting product is lowered to below about 55 and most desirably within the range of 45 to 15. The resulting rosin polyester then is the useful essential constituent of the hot-melt adhesive composition of the invention.

Although not essential thereto, the hot-melt adhesive composition of the invention also may contain minor amounts of various other and ancillary constituents as are known to the art in conventional amounts and for purposes well known in hot-melt adhesive compositions containing an ethylene-vinyl acetate resin. These useful ancillary constituents include plasticizers, fillers, pigments, dyes, stabilizers, antioxidants, and the like. Pigments, dyes, fillers, and the like may be used to obtain colored or opaque adhesives and to reduce cost or to impart firmness. Stabilizers may be included to avoid discoloration, gelation, or physical separation of the composition's constituents during excessive or prolonged heating. When used in the hot-melt composition, the sum total of all the various included ancillary constituents generally will not exceed 35 percent by weight of the composition, and of course the amount of each included should not appreciably detrimentally effect the adhesive properties of the composition to such an extent as to render the composition not useful for the particular hot-melt application being contemplated.

In general, the hot-melt adhesive composition of the invention is prepared simply by melting and mixing together its lower melting constituents, and then adding and mixing therein the high-melting constituents, at a temperature above its melting point. Its preparation aspects closely approximate the conventional preparation of hot-melt adhesive compositions. Thus one may employ extruders, kneading-type mixers, varnish kettles, or other like equipment suitably provided with heating means, e.g. oil or steam jackets, electric coil heaters, etc.

The rosin polyester which is included in the composition of the invention will be more fully understood from the several illustrative preparations thereof which follow.

EXAMPLE A

Commercial grade WW gum rosin (2000 g.) with an acid number of 166 is heated to 200° C. under an inert atmosphere and 8 phr. of β-propiolactone added until a light reflux commences. As the reflux subsides, additional β-propiolactone is added until a total of 21 phr. have been added. This is done over about a one-hour period. The temperature then is raised to 220–245° C. and held there about four hours to provide the β-propiolactone-modified rosin. During this time about 55 g. of aqueous distillate is removed and discarded. Yield of the β-propiolactone-modified rosin product is 2377 g., acid number about 255. A glycol-modified rosin is made of a 1058 g. portion of this crude β-propiolactone-modified rosin product by adding thereto 190 g. of diethylene glycol and cooking at 265° C. for two hours, whereupon 90 g. of diethylene glycol are added with the temperature raised to 280° C. and the cook held there for over three hours until a product of an acid number of 24 is obtained. This procedure of esterifying for 5 to 7 hours overall under a temperature whereat the glycol refluxes, utilizes a conventional means to distill off water of esterification from the refluxing glycol. Over this period there is removed about 91 g. of aqueous distillate. In a typical cook about ⅔ of the glycol is added to the dicarboxylic acid product and the mixture heated to 265° C. in one hour and held there about one-half hour to two hours; then the remainder of the glycol is added and the temperature raised to 280° C. over the next hour and held at 280° C. until an acid number of 20 to 30 is obtained, whereupon the temperature is lowered to 140° C. The resulting major product of the cook is a rosin polyester Ball and Ring softening point 122° F., yield about 1435 g.

EXAMPLE B 865 g. WW rosin is weighed into a 4-neck, 2-liter distilling flask equipped with thermometer/$N_2$ gas feed, stirrer, trap/condenser, and a neck for later acrylic acid addition by graduated drop funnel. The rosin is heated under a nitrogen gas blanket-cover quickly to 240° C. with stirring, after reaching its melt point, and swept strongly, with $N_2$ to remove water and turpentine volatiles which are caught in a Dean-Stark trap, until no more volatiles distill, usually within about 0.5 to 0.75 hour, (about 1.5% of original weight). The volatiles are weighed and subtracted, or the pot of rosin reweighed, i.e., 865 g. rosin−15 g. volatiles=850 g. in pot. The amount of acrylic acid to employ is calculated as follows: 850 g.×21.6% acrylic (95% pure)=185 g. acrylic to be added at rate 5 parts per 100 rosin per 0.5 hour, or slower if acrylic acid begins to reflux. Note: the addition rate is to be sure as not to reflux acrylic out of pot. Hydroquinone 500 p.p. million based on weight of rosin or 0.44 g. is employed with ½ added to the weighed acrylic acid and ½ to rosin pot to minimize isomerization of rosin acids.

The dropping funnel is fixed to the distilling flask and all joints made tight fitting. The tip of the funnel delivery tube is about ¼ inch bore and is immersed as deeply into the rosin (220–260° C.) as feasible to accommodate the stirrer with a medium rate of stirring and a blanket of nitrogen or $CO_2$ employed. The rate of acrylic is adjusted to bubble continuously into reaction (about 5 phr./0.5 hr.) and it is vaporized near the contact point of 240° C. rosin. If a good head (pressure) of acrylic is maintained, there will be minimum blow-back of rosin. If the "cook" should show evidence of refluxing acrylic, the flow is cut until this excess has reacted and the flow rate readjusted. If acrylic comes over in the condenser-trap system, it may be added back to the pot later (if dry); otherwise, one adds an equivalent amount of fresh acrylic to compensate. It requires about 5 hours to provide an acrylic-acid-modified rosin product of an acid number 245–250 and a Ball and Ring softening point of about 120° C. The acid number is determined in order to calculate the diethylene glycol to add next. If the cook needs to be cooled to weigh or set overnight, about ⅓ of the estimated diethylene glycol can be weighed and stirred into pot and the balance calculated and added later.

Calculation:

$$\text{Acid No. found} \times \frac{53.1 \text{ (eq. wt. DEG)}}{56.1 \text{ (eq. wt. KOH)}} = \text{total wt. in pot}$$

Example:

A. No. $245 \times \frac{53.1}{56.1} \times \frac{998 \text{ g.}}{1000 \text{ m.}}$ equiv.$= 231$ g.$+ 173$ g.

(75% excess)=404 g. of diethylene glycol (DEG) to be added to the 99.8% of acrylic-modified rosin to obtain the glycol-modified rosin.

With about half of the DEG and 500 p.p.m. hydroquinone (based on rosin) added to the pot, and nitrogen cover, the cook is rapidly heated to 250° C. with moderate stirring and held there for one hour. There will be a large quantity of water from reaction at this stage which is swept out rapidly by the $N_2$ flow to avoid excessive "bumping-spit." When reaction water subsides in about one hour, one commences to add the second half of DEG at a rate which will not cause bumping. This adding requires about 1–1.5 hours. The reaction temperature is increased to 260°–265° C. during this second hour and $N_2$ flow is such as to remove water rapidly as it forms. The DEG boils at 244° C. (lower in water vapor). It is necessary to provide a sufficient air-cooled elbow-type reflux means preceding the condenser to allow DEG to return to pot but still permit efficient water removal. Temperature is increased to 275° C. after the second hour, or as soon thereafter as feasible, and maintained at 275° C. for an additional 4–5 hours to provide a glycol-modified rosin of acid number of about 30 and Ball and Ring softening point of 70° F. If acid number of about 30 has not been reached, one continues to heat and analyzes at 0.5 hour intervals until that acid number is obtained.

FORMULATIONS 1, 2, AND 3

There are prepared the following basic formulations containing the ethylene-vinyl acetate resin and the rosin polyester to illustrate embodiments of the hot-melt adhesive composition of the invention.

| Formulation | 1 | 2 | 3 |
|---|---|---|---|
| Parts by weight of the rosin polyester for each 100 parts by weight of the ethylene-vinyl acetate resin | 50 | 75 | 100 |
| Ingredients, parts by weight: | | | |
| Ethylene-vinyl acetate resin [a] | 40 | 40 | 40 |
| Rosin polyester | 20 | 30 | 40 |
| Microcrystalline wax, M.P. 153° F., laminating grade [b] | 30 | 30 | 30 |

[a] Of a comonomer ratio of 67:33 weight percent ethylene: vinyl acetate, 0.78 inherent viscosity at 30° C. (0.25% by weight in toluene), and Ball and Ring softening point of 243° F., such as Elvax 150 (E. I. du Pont de Nemours & Co.).
[b] Such as Sunoco Wax 5825.

Formulations 1, 2, and 3 are prepared by placing weighed amounts of the rosin polyester and wax in a stainless steel kettle equipped with a stirrer and an oil-bath surrounding the kettle. The kettle's contents are heated to about 275° F. to 285° F. with stirring and held at that temperature until the charge is molten and appears to be a uniform homogeneous composition; generally this requires between ½ to 1 hour. The ethylene-vinyl acetate resin then is added and mixed therein until the composition again appears to be a uniform homogeneous molten mass free of lumps and the like. If desired, the composition may be cooled and solidified and then at a later time reheated to a molten state for application as a hot-melt adhesive composition. Otherwise the composition is maintained and/or brought to a suitable application temperature, generally about 280° F. and utilized for hot-melt adhesive application purposes.

To illustrate utility and advantageous properties exhibited by the foregoing illustrative basic formulations as embodiments of hot-melt adhesive compositions of the invention, a number of physical properties are determined for compositions of these formulations and for the compositions utilized to bond various adherends by hot-melt techniques. For comparison therewith there also are prepared in a like manner the same formulations, except that no rosin polyester is included therein, and except that the rosin polyester constituents is replaced on an equal weight base by gum rosin and by the pentaerythritol ester of partially hydrogenated rosin, such as Pentalyn H, and then in a like manner various physical properties determined for these comparison formulations and their bonding of adherends.

The following Tables I through IV present illustrative physical properties determined for a number of compositions embodiments of the invention along with corresponding data determined on the just-mentioned comparison formulations. Details on preparation of samples for determination of the reported property data along with description of the tests conducted also are presented. Peel strength illustrates the comparative peel or stripping of the adhesive bond. The peel strength is the average load per unit width of bond line required to separate progressively one member from the other over the adhered surfaces at a separation angle of approximately 180 degrees and at a separation rate of 12 inches per minute jaw speed. Samples prepared for the peel strength test are laminated in a Presco press at 300° F., 100 p.s.i., for 5 to 10 seconds. The samples are placed between two stainless steel plates of 1/8-inch thickness. Two sheets of 10-mil tetrafluoroethylene polymer are used between the stainless steel plates and the samples. This was done to aid in removal of samples should hot-melt adhesive get on the plates during lamination. The peel strength of the adhesive bond is evaluated using ASTM Method D903-49 except that the number of test specimens is reduced to two.

The wettability of the adhesive on the substrate is determined by a visual check, rating the specimens excellent, good, fair, or poor.

A modification of TAPPI Method T454ts-66 is used to determine the flexibility of the film of hot-melt adhesive. Films of adhesive are drawn down on 60-pound all-purpose litho paper. A modification of TAPPI Method T465sm-52 is used for creasing the paper with an approximate 2-mil thick hot-melt adhesive film. The weight used to crease the specimens is 1 kg. per 5 linear centimeters. With the hot-melt side up on a table, a 3-inch diameter, clear plastic tube approximately 3 inches high is placed on each specimen. Sand is placed in the cylinder to a depth of one inch. The same is saturated with corn oil which has been dyed blue with oil blue NE. The dyed oil penetrates the specimen wherever there is a break in the hot-melt film. After 16 hours at room temperature, the samples are evaluated on a rating scale of excellent, very good, good, fair, or poor. An excellent rating indicates no penetration of dyed oil, and a poor rating indicates that the underside of the 4-inch square had more than 50 percent of its area colored with the dyed oil.

The block resistance of the hot-melt systems is determined by TAPPI Method T477m-47. The tests are run at 120° F. in an uncontrolled humidity oven at 0.5 p.s.i.

The viscosity of the hot-melt adhesives is run on a Ferranti-Shirley viscometer at 135° C. Several viscosity readings are taken to provide a better picture of behavior at different shear rates.

TABLE I.—PEEL STRENGTH

| | | Adhesion, p.l.i.[a] | | | |
|---|---|---|---|---|---|
| Hot-melt adhesive composition containing— | Concentration, phr.[b] | Poly(ethylene-terephthalate) film | 40-lb. kraft liner board | Laminate: 40-lb. kraft liner board/ aluminum foil | After heat-stability test on polyester film [c] |
| No rosin or rosin derivative | 0 | 3.1 | 1.4 | 3.7 | 2.2 |
| Gum rosin [d] | 100 | 2.7 | 1.7 | 2.9 | 6.9 |
| Pentaerythritol ester of partially hydrogenated rosin [d] | 100 | 4.3 | 1.9 | 2.6 | 4.7 |
| Rosin polyester of Ex. A in Formula 2 | 75 | 5.0 | 2.0 | 2.9 | 5.7 |

[a] P.l.i.=pounds per linear inch.
[b] Phr.=parts rosin derivative per hundred parts of ethylene-vinyl acetate resin.
[c] 18 hours at 350° F. using agitation.
[d] Controls.

NOTE.—Hot melt adhesive composition is coated on specified substrate with a brass draw-down bar on a stainless steel hotplate using 280° F. Applied coating weights are: 20 lb./1000 ft.² on poly(ethylene terephthalate) film; 18.8 lb./1000 ft.² on 40 lb. kraft liner board; 9.5 lb./100 ft.² on aluminum foil. Laminate specimens are laminated in a Presco press at 300° F., 100 p.s.i., for 10 sec. All samples and specimens conditioned at 73° F., 50% rel. humidity for 7 days before peel strength determination on an Instron at a speed of 12 in./min.

TABLE II.—PEEL STRENGTH

| Hot-melt adhesive composition containing— | Conc. phr.[b] | Adhesion, p.l.i.[c] |
|---|---|---|
| Gum rosin | 50 | 5.6 |
| | 75 | 5.7 |
| | 100 | 6.9 |
| Pentaerythritol ester of partially hydrogenated rosin | 50 | 3.3 |
| | 75 | 4.0 |
| | 100 | 4.7 |
| Rosin polyester: | | |
| Formula 1 | 50 | 4.3 |
| Formula 2 | 75 | 6.5 |
| Formula 3 | 100 | 4.9 |

[a] Adhesive composition is coated on a poly(ethylene terephthalate) film with a brass draw-down bar on a stainless-steel hotplate to a coating thickness of ~2 mils. Specimens then are laminated in a Presco press at 280° F., 100 p.s.i., for 10 sec. Specimens are placed in a constant temperature room (73° F., 50 percent relative humidity) for 7 days before testing. Peel strength tests are made on an Instron at a speed of 12 in./min.
[b] Phr.=parts by weight of rosin derivative per hundred parts by weight of ethylene-vinyl acetate resin.
[c] P.l.i.=pounds per linear inch, average of at least 2 specimens.

TABLE III.—VISCOSITY VALUES

| | | Viscosity at 135° C. | | Viscosity at 135° C. | |
|---|---|---|---|---|---|
| Hot-melt adhesive composition containing— | Concentration phr.[a] | Before heat-stability test | After heat-stability test | Before heat stability test | After heat-stability test |
| No rosin or rosin derivative | 0 | 132.30 | 147.53 | 142.80 | 159.93 |
| Gum rosin [b] | 100 | 54.73 | 45.92 | 56.54 | 46.55 |
| Pentaerythritol ester of partially hydrogenated rosin [b] | 100 | 75.19 | 76.38 | 79.11 | 79.96 |
| Rosin polyester of Ex. A in Formula 1 | 75 | 74.60 | 83.88 | 78.54 | 87.54 |

[a] Phr.=parts by weight rosin derivative per hundred parts by weight of ethylene-vinyl acetate resin.
[b] Controls.

TABLE IV.—PROPERTY DATA

| Hot-melt adhesive composition containing— | Concentration, phr. | Color of Hot Melt [a] | | Flexibility of hot-melt films [b] | | Blocking test [c] | Wettability test [d] | | | |
|---|---|---|---|---|---|---|---|---|---|---|
| | | Before stability test | After stability test | Sample 1 | Sample 2 | | Mylar | 40 KLB | 60 APL | Al foil |
| No rosin or rosin derivative | 0 | Cream | Straw yellow | E | E | 2 | 4 | 4 | 4 | 4 |
| W.W. rosin [e] | 100 | Light yellow | Dark red brown | F | F-P | 2 | 3 | 4 | 4 | 4 |
| Pentaerythritol ester of partially hydrogenated rosin.[e] | 100 | Light yellow | Dark straw yellow | F-P | F | 2-3 | 3 | 3 | 4 | 4 |
| Rosin polyester of Ex. A in Formula 2. | 75 | Straw yellow | Brownish yellow | VG | GG | 2 | 3 | 4 | 3-4 | 3 |

[a] Stability test was run at 280° F. for 18 hours using agitation.
[b] Flexibility ratings: E=Excellent, VG=Very good, G=Good, F=Fair, P=Poor.
[c] Blocking test was run at 120 F. for 24 hours at 0.5 p.s.i. Blocking Ratings: 4=complete, 3=considerable, 2=slight, 1=no.
[d] Substrate abbreviations: Mylar=Mylar film (1½ mil), 40 KLB=40-lb. kraft liner board, 60 APL=60-lb. all purpose litho paper, Al Foil=1 mil pure aluminum foil. Applied coating weights in lbs./1000 ft.²; on Mylar—9.0, on 40 KLB—18.8, on 60 APL—9.7, and on Al Foil—9.5.
[e] Controls.

In addition to the preceding illustrative embodiments of the composition of the invention, one similarly can employ therein other ethylene-vinyl acetate resins, which are known to be useful in hot-melt adhesive compositions, in place of the specific ethylene-vinyl acetate resin specified in Formulations 1, 2, and 3; and likewise in such compositions employ the rosin polyester of Example B as well as other rosin polyesters prepared as described herein in place of the rosin polyester of Example A to provide other and additional illustrative embodiments of the hot-melt adhesive composition of the invention. While the properties of these additional composition embodiments will not necessarily be identical to the property data determined and reported in the preceding tables, it will be found on the whole that each of these prepared hot-melt adhesive compositions exhibit adequate properties to provide utility in hot-melt adhesive bonding applications.

We claim:
1. A hot-melt adhesive composition, in relative proportions by weight, consisting essentially of:
   (a) 100 parts of an ethylene-vinyl acetate resin of Ball and Ring softening point between 220° F. and 280° F. and whose ethylene/vinyl acetate weight percent comonomer ratio is between 85:15 and 65:35;
   (b) between 40 and 120 parts of a petroleum-derived wax selected from the group consisting of paraffin wax of a melting point between 120° and 160° F. and microcrystalline wax of a melting point between 150° and 195° F.; and
   (c) between 25 and 125 parts of a rosin polyester having an acid No. below 45 and a Ball and Ring softening point between 50 and 150° F., which rosin polyester is the diethylene glycol ester of β-propiolactone-modified or acrylic-acid-modified rosin, which is the addition product of from 5 to 21.6 parts by weight of β-propiolactone or acrylic acid and 100 parts by weight of rosin of more than 70 percent rosin acid content, from an esterification employing between 110 and 200 percent of the amount of diethylene glycol required to react all of the carboxyl groups of the addition product.

2. The composition of claim 1 which contains between 70 and 80 parts by weight of the petroleum-derived wax and between 60 and 90 parts by weight of the rosin polyester having an acid No. between 45 and 15 and a Ball and Ring softening point between 50 and 150° F.

3. The composition of claim 2 which contains microcrystalline wax as the petroleum-derived wax and whose rosin polyester is the esterification product of the diethylene glycol and β-propiolactone-modified rosin.

4. The composition of claim 2 which contains microcrystalline wax as the petroleum-derived wax and whose rosin polyester is the esterification product of diethylene glycol and acrylic-acid-modified rosin.

References Cited

UNITED STATES PATENTS

| | | | |
|---|---|---|---|
| 3,025,167 | 3/1962 | Butler | 260—27 |
| 3,325,430 | 6/1967 | Grasley | 260—25 |
| 3,317,445 | 5/1967 | Halbrook et al. | 260—97 |
| 2,973,332 | 2/1961 | Fikentscher et al. | 260—26 |

DONALD E. CZAJA, Primary Examiner

W. E. PARKER, Assistant Examiner

U.S. Cl. X.R.

260—28.5 AV